United States Patent [19]

Rasmussen et al.

[11] Patent Number: 5,283,126
[45] Date of Patent: * Feb. 1, 1994

[54] UTILIZATION OF FLEXIBLE COATING ON STEEL TO IMPART SUPERIOR SCRATCH AND CHIP RESISTANCE

[75] Inventors: Willaam A. Rasmussen, Glenwood; Michael Jackson, LaGrange, both of Ill.

[73] Assignee: Bee Chemical, Lansing, Ill.

[*] Notice: The portion of the term of this patent subsequent to Dec. 8, 2009 has been disclaimed.

[21] Appl. No.: 905,931

[22] Filed: Jun. 29, 1992

Related U.S. Application Data

[63] Continuation-in-part of Ser. No. 752,103, Aug. 29, 1991, Pat. No. 5,169,725.

[51] Int. Cl.$^5$ .............................................. B32B 15/08
[52] U.S. Cl. ..................................... 428/457; 428/458; 428/463; 428/482
[58] Field of Search ................. 428/457, 458, 463; 524/39; 525/162

[56] References Cited

U.S. PATENT DOCUMENTS

| | | | |
|---|---|---|---|
| 4,293,457 | 10/1981 | Simon | 524/39 |
| 4,960,828 | 10/1990 | Higuchi et al. | 525/162 |
| 5,169,725 | 12/1992 | Rasmussen et al. | 428/458 |

FOREIGN PATENT DOCUMENTS

| | | | |
|---|---|---|---|
| 90/00283 | 9/1990 | PCT Int'l Appl. | C09D 167/00 |
| 1126307 | 9/1968 | United Kingdom | C08F 15/40 |

*Primary Examiner*—Thomas J. Herbert, Jr.
*Attorney, Agent, or Firm*—Wayne E. Nacker; Gerald K. White

[57] ABSTRACT

Electro-deposition-coated steel is top coated with a flexible coating formed of a polyester having —OH functionality, a polyacrylate having —OH functionality and melamine-formaldehyde resin to provide substantially a stoichiometric amount of reactive sites relative to the total amount of —OH functionality of the polyester and the polyacrylate. The flexible coatings exhibit superior chip and scratch resistance relative to rigid coatings of the type conventionally used in the automotive industry.

9 Claims, No Drawings

UTILIZATION OF FLEXIBLE COATING ON STEEL TO IMPART SUPERIOR SCRATCH AND CHIP RESISTANCE

This is a continuation-in-part of copending application Ser. No. 07/752,103 filed on 29 Aug. 1991 now U.S. Pat. No. 5,169,725, issued 8 Dec. 1992.

The present invention is directed to the use of flexible coatings on steel, particularly for applications where rigid coatings were heretofore considered to be required.

BACKGROUND OF THE INVENTION

Historically, one area of concern with painted exterior car and truck bodies is chip and scratch resistance. Utilizing an electro-deposition process, steel car bodies are primed with an organic coating prior to top coating. This primed steel is referred to as "E-coated steel". The coating may be any of a variety of polymeric materials known in the art which contain an ionic moiety which causes them to migrate to either the anode or cathode of a electrophoretic plating bath, the metal part to be plated serving as the cathode or anode according to the polymer. Electrodeposition is described, for example, in "Automotive Coatings" Bruce McBane, Federation of Societies for Coating Technology, September 1987. An advantage of E-coating of steel or other metals is that the build-up of polymers is self-limiting because the build-up of polymer on the metal renders the surface progressively less conductive. Accordingly, very uniform coatings are achieved. In most cases a second primer, referred to as a "primer-surfacer" is applied to the E-coated steel. The nominal film build on this primer-surfacer is 1.2 mils with a nominal bake of 25 minutes at 325° F. The topcoat is usually a 1-component, acid catalyzed polyol-melamine, a 2-component polyol-polyisocyanate system or a 1-component polyol-blocked polyisocyanate system. To a lesser extent, certain 2-component "non-isocyanate" coatings are utilized as exterior topcoats. The coating may be a single coat color, a dual coat (colorcoat/clearcoat) or a tricoat (colorcoat/tinted clearcoat/clearcoat) system. All of the above systems have excellent durability as tested by UV light resistance and are categorized as hard, rigid, non-flexible coatings.

Flexible paints over flexible plastic substrates are utilized in areas of automobiles and trucks where impact and chip resistance are of concern. The areas include bumpers, grilles, and rocker panel areas. A flexible coating is defined herein as a coating when applied and baked on flexible substrate such as TPU (thermoplastic urethane) shows no cracking when subjected to a 1" mandrel bend at 75° F., 0° F., and −20° F.

Previously, flexible coatings have not been deemed acceptable for application to rigid substrates such as E-coated steel because of certain deficiencies. The deficiencies include too soft (easily scratched and marred), not finessible (not repairable via a buffing and polishing procedure) and excessive dirt pick-up.

SUMMARY OF THE INVENTION

In accordance with the invention, it is found that flexible paints of specific formulation may be applied to E-coated steel and produce a finish with scratch and chip resistance superior to that of rigid coatings of the types commonly used in the automotive industry. In particular flexible coatings are utilized in the invention in which the binder is a combination of an —OH—functional polyester, an —OH— functional acrylate and melamine-formaldehyde resin adapted to react stoichiometrically with the —OH functionalities of the polyester and acrylate resins.

DETAILED DESCRIPTION OF CERTAIN PREFERRED EMBODIMENTS

The coatings which provide a flexible, scratch and chip resistant finish in accordance with the invention are formulated from (a) hydroxyl-functional polyesters, (b) hydroxyl-functional polyacrylates, and (c) melamine/formaldehyde resins in such proportion as to react stoichiometrically with the hydroxyl functionalities of the polyacrylate and polyester. The stoichiometry of the melamine-formaldehyde resin with the hydroxyl functionality provides for a complete cure of the coating in a single bake, which appears to be important in achieving the scratch and chip resistance in the finishes in accordance with the invention.

Polyesters useful in the coatings of the present invention are low molecular weight, e.g., in the weight average range of between about 500 and about 2000, and have hydroxyl functionalities in the range of from about 150 to about 1000 gm eq. wt. Specifically useful polyesters are formed from adipic acid, neopentyl glycol and trimethylol propane. More specifically, in a preferred embodiment of the present invention, a polyester is utilized which is formed having a molar ratio of 3 neopentyl glycol:3 adipic acid:1 trimethylol propane, a weight average molecular weight of about 777 and an —OH gm. eq. wt. of about 259.

Polyacrylates useful in accordance with the present invention are formed from acrylate ester monomers, at least some of which provide —OH functionality. Hydroxyl functionality of the polyacrylates is between about 500 and about 2500 gm. eq. wt. In particular, the monomers are esters of acrylic and methacrylic acids. Specfically useful polyacrylates are formed of methyl methacrylate (MMA), 2-ethylhexyl acrylate (2-EHA), and 2-hydroxyethyl methacrylate (HEMA). The acrylates have equivalent weights (gm/eq —OH) in the range of from about 1000 to about 1500, most preferably in the range of about 1250, weight average molecular weights in the range of from about 5000 to about 10,000, most preferably in the range of about 6700 and number average molecular weights in the range of from about 2000 to about 4000, most preferably in the range of about 3000. A particularly preferred polyacrylate has a molar ratio of MMA:2-EHA:HEMA of about 8.3:1.2:1.

The melamine-formaldehyde resins utilized are preferably totally alkylated melamines such as totally methylated melamine or totally methylated/butylated melamine.

Considering the resin composition in total to be 100 parts resin, the polyester comprises between about 29 and about 87 parts per hundred resin (phr), the polyacrylate comprises between about 2 and about 60 phr and the melamine-formaldehyde resin between about 11 and about 50 phr.

Although each melamine molecule has six reactive sites, not all react with the hydroxyl functionalities of the polyester and polyacrylate resins. Steric hindrance effectively reduces the number of reactive sites per melamine moiety to about 2.5. To provide the correct amount of the melamine-formaldehyde resin to stoichiometrically react with the available hydroxyl functionality of the polyester and polyacrylate, each melamine moiety is therefore considered to effectively provide on the average about 2.5 reactive sites. By a substantially stoichiometric correspondence of reactive nitrogens to polymer—OH functionality is meant an equivalent number of reactive nitrogens plus or minus about 5%.

Suitable coatings for use in the present invention are sold by Morton International under the trademark Unicoat. Heretofore, these coatings have been utilized primarily on flexible automotive parts.

In addition to the binder polymers the coating compositions may contain a variety of additional ingredients as is known in the art. Amounts of additional ingredients are expressed in parts per hundred resins (phr). A clear coat may have no pigment. A pigmented coating may contain between about 2 and about 30 phr pigment. Minor ingredients include additives to prevent sag, UV stabilizers, cure catalysts, plasticizers, antioxidants etc.

To meet specific application requirements, various rheological additives may be incorporated into the formulation. These additives are usually used at less than 1% by weight of the formulation. These additives include microgel flow control agents, polyethylene waxes, organoclays, various silicone-containing oils and fluids, and other rheological additives.

The coatings are solvent based, the preferred primary solvents being a mixture of esters and aromatics. Total solids of the coating compositions range from between about 45 and about 65%

The coatings of the present invention provide surprising chip and scratch and mar resistance when applied to steel, particularly E-coated steel with or without a primer-surfacer coating. This scratch and mar resistance is particularly desirable in automotive coatings, both to prevent in-plant defects and for maintenance of the finish once a vehicle leaves the plant and is subjected to sand, gravel and salt.

Coatings may be applied via any of the conventional state-of-the-art spray equipment, such as spray guns, electrostatic rotary atomizers, HVLP (high volume, low pressure) equipment, etc. Nominal film build and baking conditions are similar to those of conventional rigid coatings. Typical bake temperatures are in the range of from about 100° C. to about 135° C. and bake times in the range of between about 20 and about 25 min.

The invention will now be described in greater detail by way of specific examples.

While the invention is directed to applying coatings to substrates intended to be flexed, impact and abrasion resistances of the coatings are defined herein with respect to their hardness and resistance on rigid substrates, as standard tests exist for impact and abrasion resistances on rigid substrates. On rigid substrates, the coatings used herein have a minimum ASTM Gravelometer rating of 8A when subjected to 1, 5, and 10 parts of gravel at 77° F. and −20° F. On rigid substrates, the coatings have a maximum of 50 mgs. weight loss when subjected to 1000 cycles on a Taber abraser CS-10 wheels and 1000 grams weights.

EXAMPLE 1

A flexible white coating composition useful in accordance with the invention is formulated as follows:

| | WT. % |
|---|---|
| SOLVENTS | |
| Methanol | 8.41 |
| Isopropyl Alcohol | .13 |
| Isobutyl Alcohol | .01 |
| N-Butyl Alcohol | .04 |
| Isobutyl Acetate | 4.05 |
| N-Butyl Acetate | .00 |
| Primary Amyl Acetate | 4.05 |
| Propylene Glycol Methyl Ether Acetate | 5.68 |
| Toluene | .53 |
| Xylene | .38 |
| Ethyl Benzene | 7.65 |
| Acetone | 2.16 |
| Methyl Ethyl Ketone | 7.18 |
| Formaldehyde | .06 |
| PIGMENTS | |
| Carbon Black | .01 |
| Phthalocyanine Blue | .00 |
| Basic Nickel Carbonate | .00 |
| Titanium Dioxide | 15.43 |
| Fumed Silica | .36 |
| Silicone Dioxide | .05 |
| Iron Oxide (Yellow) | .02 |
| RESINS, ADDITIVES | |
| Cellulose Acetate Butyrate (Cab 551-0.01) (Eastman) | 1.34 |
| Cellulose Acetate Butyrate (Cab 381-0.05) (Eastman) | .16 |
| Cellulose Acetate Butyrate (Cab 171-15S) (Eastman) | .22 |
| Butyl Benzyl Pthalate | .13 |
| Melamine-Formaldehyde Resin (Resimene 745) (Monsanto) | 12.67 |
| P-Toluene Sulfonic Acid | .06 |
| U.V. Absorber (Tinuvin 1130) (Ciba-Geigy) | .85 |
| Dispersant (BYK-Mallinkrodt) | .00 |
| Phenyl Acid Phosphate | .13 |
| Hindered Amine Light Stabilizer (Tinuvin 079) (Ciba-Geigy) | .22 |
| Acetylenic Diol (Surfynol 104 PA) (Air Products) | .03 |
| Dimethylpolysiloxane Copolymer (BYK 344) (BYK-Mallinkrodt) | .04 |
| Proprietary Leveling Aid (Masil 260) (PPG Mazer Chemicals) | .03 |
| Acrylic Resin | 4.49 |
| Polyester Resin | 23.32 |

The polyester utilized in the formulation is formed from.

| COMPONENT | |
|---|---|
| Neopentyl Glycol | 35.58 |
| Trimethylol Propane | 13.63 |
| Adipic Acid | 44.35 |
| Phenyl Acid Phosphate | 0.21 |
| Ethyl Benzene | 6.23 |

The neopentyl glycol is loaded into a reactor. To this is added the trimethylol propane and the phenyl acid phosphate under agitation. The reactor is heated to 180° F. (82° C.) and the adipic acid is added. The reactor is sparged with nitrogen and then the ethyl benzene is added. The reactor is heated to 420° F. (216° C.). Water is collected and ethyl benzene is returned. The OH and acid values are checked after about 50% of the water is collected and any necessary corrections are made. The material is cooked until the acid value is less than 5.0, after which the material is cooled.

The polyacrylate utilized in the formulation is formed by condensation polymerization from the following materials:

| COMPONENT | WT. % |
|---|---|
| MMA | 43.26 |
| 2-EHA | 11.75 |
| HEMA | 6.80 |
| N-Dodecyl Mercaptan | 2.16 |
| Vazo 64 (Azodiisobutyronitrile) (DuPont) | 1.54 |
| Methyl Ethyl Ketone (MEK) | 11.66 |
| Ethyl Benzene | 22.83 |

The ethyl benzene is loaded into a cooker; the monomers are loaded into a monomer tank; and the MEK and Vazo 64 are loaded into an initiator tank, each vessel being sparged with nitrogen. The ethyl benzene is heated to 205° F. (96° C.). The entire contents of the monomer tank and 85% of the initiator tank are metered into the cooker over 5 hours, maintaining the temperature at 205° F. The remaining 15% of the initiator solution is metered in over an additional hour, and the reaction is allowed to complete in another one hour at 205° F. Subsequently, the batch is cooled.

EXAMPLE 2

This study compares stone chip resistance of a flexible coating by Morton International, Inc. under the designation 87058-UR560CAFH versus a rigid coating. Both colors are of Medium Cabernet Red.

Bonderite 40 phosphated cold rolled steel panels coated with M64J23 electro-deposition primer (sold by ACT) were utilized to generate results for this report. 3"×6" panels were cut for testing in a Gravelometer cabinet.

Panels were prepared as follows:

Half of each panel coated with automotive approved Taupe primer (sold by DuPont), flashed at room temperature for 5 minutes, and baked 25 minutes at 290° F.

After taping off a ⅜" section (for film build determination) panels were coated by spraying with 87058-UR560CAFH (sprayed as supplied) and the rigid coating (thinned to 25" #4 Ford cup with Xylene). Panels were flashed for 5 minutes, then baked 25 minutes at 290° F.

Panels were then taped off length-wise, and both coatings were applied to simulate a repair coat. Flash time for this step was 5 minutes, and panels were baked for 17 minutes at 255° F.

The result of this panel preparation yielded four 1.5"×3" quadrants:
1. Topcoats directly over M64J23 (no Taupe, no recoats).
2. Topcoat directly over M64J23 with recoat topcoat.
3. Same as Quad. No. 1, with Taupe primer over M64J23.
4. Same as Quad. No. 2, with Taupe primer over M64J23.

Chip resistance was determined by using a Q-panel Q.G.T. Gravelometer. Each paint system was subjected to one, five, and ten pints of gravel (ASTM approved type), both at room temperature (72° F.), and at −20° F. All testing was performed in triplicate to ensure reproducibility of results.

The following results list the ASTM rating for size and density of chips to the electro-deposition primer. Also, a brief description of damage to each quadrant is listed for each panel.

| RESULTS: | |
|---|---|
| 87058-UR560CAFH | RIGID SAMPLE |
| With one pint gravel at room temperature. | |
| ASTM Rating = 8A | ASTM Rating = 8C |
| One small chip to | Several large chips to |
| E-coat on Quadrant 1. | Quadrants 2 and 4. |
| Quadrants 2, 3, and 4 OK. | One small chip to E-Coat on Quad. 1 and 3 OK. |
| At −20° F. | |
| ASTM Rating = 8A | ASTM Rating = 8C |
| No chips to E-coat. | Several large chips to Quadrants 2 and 4. Several small chips to E-coat on Quadrants 1 and 3. |
| With five pints gravel at room temperature. | |
| ASTM Rating = 8A | ASTM Rating = 7C |
| One very small chip to E-coat on Quadrant 1. Quadrants 2, 3, and 4 OK. | Several Large chips to E-coat on Quadrant 2, 3, and 4. Several small chips to E-coat on Quadrant 1. |
| At −20° F. | |
| ASTM Rating = 8A | ASTM Rating = 7C |
| Several small chips to E-coat on Quadrant 1. Quadrants 2, 3, and 4 OK. | Large chips to E-coat on Quadrants 2, 3, and 4. Several small chips to E-coat on Quad. 1. |
| With ten pints gravel at room temperature. | |
| ASTM Rating = 8A | ASTM Rating = 7D |
| Several small chips to E-coat on Quadrants 3 and 4. Quadrants 1 and 2 OK. | Large Chips to E-coat on all quadrants. |
| At −20° F. | |
| ASTM Rating = 8A | ASTM Rating = 7D |
| Several small chips to E-coat on all quadrants. | Large chips to E-coat on all quadrants. |

CONCLUSION

Very striking differences were observed in comparing 87058-UR560CAFH and the rigid material. The flexible coating shows progressively more topcoat "dents" and the amount of gravel it was subjected to increased; however, the number of chips through to the E-coat was low throughout the test series. Also, significant with the flexible system is the fact that all of the chips that did penetrate to the E-coat were quite small—most in the 0.5-1.5 mm range. Minimal differences were noted with room temperature vs. −20° F. testing, indicating that the flexible material is not embrittling at low temperatures.

The rigid coating showed considerably more damage upon testing. Not only did this coating show significantly more chips than the flexible material, but the chips were of a much larger size, some at least 5 mm in diameter. Contrary to the UR560CAFH results, the number and size of chips to E-coat increased dramatically with increased gravel volume. The rigid coating's chip resistance appeared to be poorest directly over E-coat (no Taupe primer), and also seems to worsen when recoated. Also contrary to the UR560CAFH results, the rigid coating appears to show poorer chip resistance with the −20° F. testing compared to testing performed at room temperature.

EXAMPLE 3

Steel wood scratch test of a black flexible coating and a black rigid enamel.

PROCEDURE

Prepare 4"×12" E-coated steel with each system being evaluated. Bake all panels at identical times and temperatures to ensure consistent cure conditions.

Tape panels being evaluated side by side to a flat surface, so that both panels are in contact with each other, but not overlapping.

Then, using steel wool (any grade is acceptable), with moderate pressure wipe back and forth over the secured panels, making sure to apply the same pressure over both panels. Direct visual comparisons can be made at this time. The number of rubs is relative, but 20 double rubs is used for demonstration purposes.

These test results can be quantified by taking multiple 20° gloss readings on scratched area and calculating the mean 20° gloss. 20° gloss is used as this measurement is an excellent quantifier or surface haze.

The results below were obtained by rubbing side by side test panels with a back and forth motion, using 000-grade steel wool (applying moderate pressure). All 20° gloss readings were taken four times on each section of the panels to ensure accuracy of results. The results are given below:

| RESULTS OF STEEL WOOL ABRASION TESTING | | |
|---|---|---|
| | UNICOAT ™ 38522-UR560 CAFH BLACK TOPCOAT | RIGID BLACK ENAMEL TOPCOAT |
| INITIAL (UNTESTED) | | |
| 1 | 85% | 90% |
| 2 | 86% | 88% |
| 3 | 86% | 89% |
| 4 | 89% | 86% |
| X | 86.50% | 88.25% |
| FIVE DOUBLE RUBS (000 STEEL | | |
| 1 | 83% | 35% |
| 2 | 84% | 32% |
| 3 | 81% | 27% |
| 4 | 79% | 24% |
| X | 81.75% | 29.50% |
| % GLOSS RETENTION | 94.51% | 33.42% |
| TEN DOUBLE RUBS (000 STEEL | | |
| 1 | 73% | 2% |
| 2 | 71% | 3% |
| 3 | 74% | 2% |
| 4 | 72% | 6% |
| X | 72.50% | 3.25% |
| % GLOSS RETENTION | 83.81% | 3.68% |
| TWENTY DOUBLE RUBS (000 STEEL | | |
| 1 | 56% | 0.5% |
| 2 | 52% | 0.4% |
| 3 | 54% | 0.6% |
| 4 | 54% | 0.6% |
| X | 54.00% | 0.50% |
| % GLOSS RETENTION | 62.43% | 0.56% |

As can be seen with the above results, the flexible coating shows significantly reduced surface haze as a result of steel wool abrasion. With five double rubs the flexible black monocoat retained 94.51% of its original 20° gloss, while the rigid black monocoat retained 33.42% of its original 20° gloss.

With twenty double rubs, the flexible black coating retained 83.81% 20° gloss, while the rigid black coating retained 3.68% 20° gloss.

With twenty double rubs, the flexible black coating retained 62.43% 20° gloss, while the rigid black coating retained 0.56% 20° gloss.

From these results, it is obvious that the flexible black monocoat displays a much higher degree of resistance to surface scratching than the rigid black monocoat.

EXAMPLE 4

Abrasion resistance comparison of a flexible coating system with a commercial rigid coating.

PANEL PREPARATION

The color chosen for this study was a rigid commercial white and a flexible coating sold by Morton International under the designation 84021-UR560CAFH. The samples were thinned to spray viscosity with their respective thinners. The samples were sprayed over Bonderite 40 steel panels with 64J23 electro-deposition coating.

The materials were sprayed to hiding (1.5 mils) with a Binks Model 62 conventional air atomization gun at 60 psi. The coatings were applied in two coats with a 60 second flash between coats. After second coat application, the panels were flashed at room temperature for 5 minutes before baking for 17 minutes at 129° C. (standard bake).

All panels were aged 72 hours before the Taber Abraser test was performed.

PROCEDURE

Two panels of each coating were tested on the Taber Abraser to ensure reportable results. The following are the Taber Abraser parameters:
CS-10 wheels
1000 gram weights
1000 cycles All panels were weighted to three decimel points (mg) prior to performing the test. The panels were then subjected to the Taber Abraser under the above stated parameters. Once the test was completed, panels were lightly wiped off with a damp IPA cloth to remove any loose paint adhering to the surface. Panels were flashed for one hour to ensure the evaporation of IPA and then re-weighed. Weight losses were determined for each panel, and then the average was taken for each set.

| | RESULTS: | | |
|---|---|---|---|
| | PRE-TEST WEIGHT | POST-TEST WEIGHT | WEIGHT LOSS |
| | Rigid Sample | | |
| Panel 1 | 58.098 | 58.028 | 0.070 |
| Panel 2 | 56.493 | 56.379 | 0.114 |
| Average Weight Loss | | | 0.092 |
| | Flexible Sample | | |
| Panel 1 | 56.933 | 56.898 | 0.035 |
| Panel 2 | 56.088 | 56.045 | 0.043 |
| Average Weight Loss | | | 0.039 |

CONCLUSION

As can be seen by the results shown above, the flexible coating had a 60% less weight loss compared to the competitive rigid system after identical Taber Abraser testing. This property would show the flexible system to have several advantages over the rigid system:
1) Better scratch resistance during assembly plant "build-ups", i.e., fewer in-plant repairs.

2) Greater environmental scratch resistance (i.e., new car transport, automatic car washes, tree limb abrasion, etc.), leading to improved customer satisfaction with exterior finishes.

3) Improved stone chip resistance.

While the invention has been described in terms of in preferred embodiments, modifications obvious to one with ordinary skill in the art may be made without departing from the scope of the present invention.

Various features of the invention are set forth in the following claims.

What is claimed is:

1. Coated steel comprising a steel substrate, an electrodeposited organic coating thereon and at least one layer of a cured coating composition, said coating composition prior to curing comprising between about 29 and about 87 phr of a polyester having hydroxyl functionality at between about 150 and about 1000 gm. eq. wt., between about 2 and about 60 phr of a polyacrylate having hydroxyl functionality at between about 500 and about 2500 gm. eq. wt., and between about 11 and about 50 phr of melamine formaldehyde resin, said melamine-formaldehyde resin providing a substantially stoichiometric amount of reactive sites relative to the total hydroxyl functionality of said polyester and said polyacrylate, calculating each melamine moiety as having 2.5 reactive sites, said cured coating composition showing no cracking when subjected to a 1" mandrel bend at 75° F., 0° F. and −20° F., said cured coating, if applied to a rigid E-coated substrate, having a minimum ASTM Gravelometer rating of 8A when subjected to 1, 5, and 10 parts of gravel at 77° F. and −20° F. and a maximum of 50 mgs. weight loss when subjected to 1000 cycles on a Taber abraser utilizing CS-10 wheels and 1000 gram weights.

2. Coated steel according to claim 1 wherein said melamine-formaldehyde resin in said uncured coating composition is fully alkylated.

3. Coated steel according to claim 1 including a primer-surfacer layer between said electrodeposited organic coating and said cured coating compositon.

4. Coated steel according to claim 1 wherein the weight average molecular weight of said polyester is between about 500 and about 2000.

5. Coated steel according to claim 1 wherein the weight average molecular weight of said polyacrylate is between about 5000 and about 10,000.

6. Coated steel according to claim 1 wherein said polyester is a terpolymer of neopentyl glycol, adipic acid and trimethylol propane.

7. Coated steel according to claim 6 wherein said neopentyl glycol, adipic acid and trimethylol propane are copolymerized at a molar ratio of about 3:3:1.

8. Coated steel according to claim 1 wherein said polyacrylate is a terpolymer of methyl methacrylate, 2-ethylhexyl acrylate and 2-hydroxyethyl methacrylate.

9. Coated steel according to claim 8 wherein methyl methacrylate, 2-ethylhexyl acrylate and 2-hydroxyethyl methacrylate are polymerized at a molar ratio of about 8.3:1.2:1.

* * * * *